United States Patent [19]

Lee

[11] 4,024,848
[45] May 24, 1977

[54] ARRANGEMENT FOR PREVENTING WATER FROM ENTERING A FUEL SYSTEM OF AN INTERNAL COMBUSTION ENGINE

[75] Inventor: Wenpo Lee, Wolfsburg, Germany

[73] Assignee: Volkswagenwerk Aktiengesellschaft, Germany

[22] Filed: Apr. 28, 1975

[21] Appl. No.: 572,329

[30] Foreign Application Priority Data

May 7, 1974 Germany .......................... 2421938

[52] U.S. Cl. .................. 123/136; 123/1 A; 123/198 A; 220/85 VR
[51] Int. Cl.² ........................................ B01D 53/26
[58] Field of Search ............. 123/136, 1 A, 198 A; 220/85, 85 US, 85 VR, 86

[56] References Cited
UNITED STATES PATENTS

| | | | |
|---|---|---|---|
| 1,566,944 | 12/1925 | Wilson | 220/85 VR |
| 2,603,557 | 7/1952 | Roush | 123/127 |
| 2,968,585 | 1/1961 | Glammarria | 123/198 A |
| 3,515,107 | 6/1970 | Joyce | 123/136 |
| 3,538,896 | 11/1970 | Tobias et al. | 123/136 |
| 3,675,634 | 7/1972 | Tatsutomi et al. | 123/136 |
| 3,749,376 | 7/1973 | Alm et al. | 123/1 A |
| 3,763,839 | 10/1973 | Alquist | 123/136 |
| 3,838,667 | 10/1974 | Csicery | 123/136 |

Primary Examiner—Wendell E. Burns
Assistant Examiner—David D. Reynolds
Attorney, Agent, or Firm—Brumbaugh, Graves, Donohue & Raymond

[57] ABSTRACT

An internal combustion engine operated with a gasoline-methanol mixture as fuel comprises a fuel system, a water-absorbing filter and a ventilating line passing through the filter. When moisturized air is flowing through the ventilating line, the filter removes the moisture so that the fuel system is ventilated with dry air.

9 Claims, 2 Drawing Figures

ARRANGEMENT FOR PREVENTING WATER FROM ENTERING A FUEL SYSTEM OF AN INTERNAL COMBUSTION ENGINE

BACKGROUND OF THE INVENTION

The present invention relates essentially to an arrangement for preventing water from entering a fuel system of an internal combustion engine operated with a gasoline-methanol mixture as fuel.

Internal combustion engines, e.g., automobile engines, of a type operated with methanol or a gasoline-methanol mixture in place of gasoline have been known for many years. However, when a fuel mixture composed of gasoline and methanol is used, it has been found that the introduction of water to the fuel mixture causes it to separate into its constituent parts. Separation of the fuel mixture disadvantageously effects the operating behavior of the internal combustion engine. In particular, the fuel delivery device, e.g., the carburetor or other injection element, of the internal combustion engine is usually adjusted for operation with a fuel mixture having a constant composition. When the composition of the fuel is changed by its separation, the fuel supplied to the delivery device of the internal combustion engine no longer corresponds to the desired composition which is selected with regard to the specific operating conditions of the internal combustion engine. Moreover, when a gasoline-methanol mixture is used as fuel in an automobile, there is the danger that moisture contained in air flowing through a ventilating line of a fuel system may enter the fuel system resulting in the undesired separation of the fuel mixture.

SUMMARY OF THE INVENTION

It is an object of the present invention to provide an internal combustion engine, of a type operated with a gasoline-methanol mixture, which avoids the difficulties and disadvantages of the prior art engines noted above.

This object, as well as other objects which become apparent in the discussion that follows, are achieved, according to the present invention, by an arrangement which prevents water from entering a fuel system of an internal combustion engine operated with a gasoline-methanol mixture as fuel.

In accordance with the present invention, a fuel system of an internal combustion engine is provided with a ventilating line which passes over a filter comprising a water-absorbing material. Since the ventilating line for the fuel system passes over the water-absorbing material, e.g., silicagel, moisture in the ventilating line is removed so that the fuel system is ventilated with dry air, whereby the undesirable separation of the fuel mixture is prevented.

Another aspect of the present invention involves a heating device for the water-absorbing filter which operates only when the internal combustion is in operation and provides for the rapid regeneration of the filter by evaporation of the water absorbed therein. In accordance with one embodiment of the present invention, there may be provided an electric heating device which, in an internal combustion engine equipped with a battery-charging generator, may be operated by the excess energy produced by the generator. Alternatively, the normally discharged exhaust gases emitted from the internal combustion engine may be utilized to heat the water-absorbing filter.

Moreover, in a fuel system equipped with an activated charcoal filter for absorption of vaporous fuel components, the activated charcoal filter may be arranged between the water-absorbing filter and the fuel system so that the inflowing air passing through the filters and into the fuel system so that the inflowing air passing through the filters and into the fuel system is effectively dewatered.

BRIEF DESCRIPTION OF THE DRAWING

For a further understanding of the present invention, reference may be had to the accompanying drawing, in which.

DESCRIPTION OF THE PREFERRED EMBODIMENTS

Figure 1:
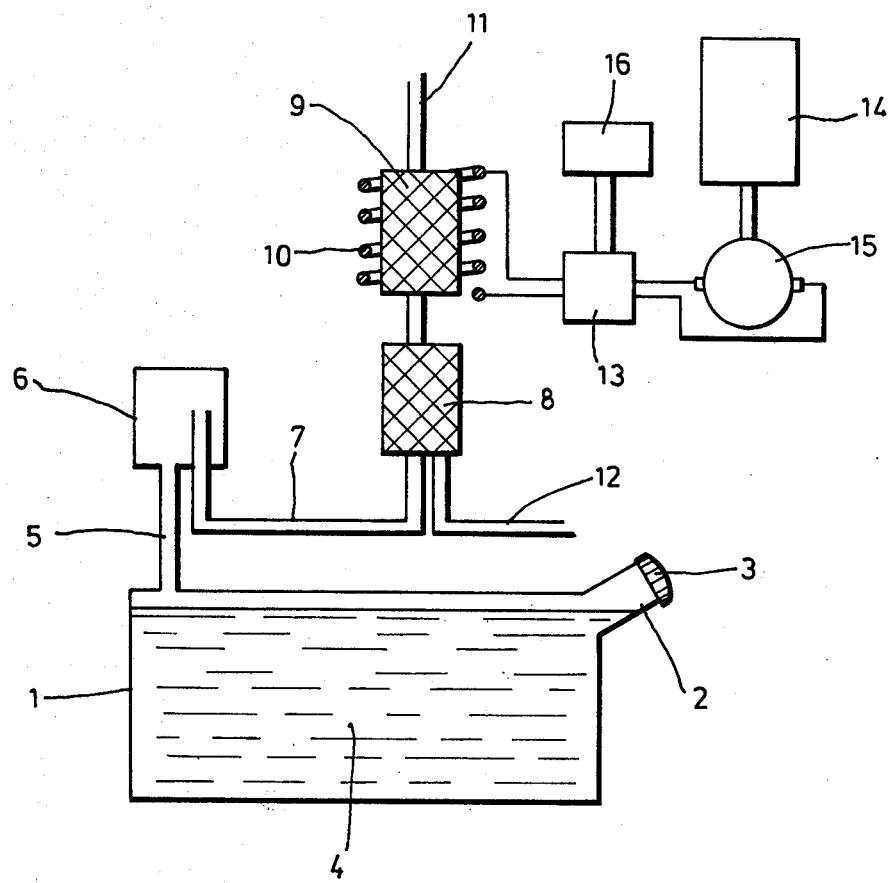
FIG. 1 is a partial illustration of a fuel system of an automobile showing an exemplary embodiment of the present invention.

The preferred embodiments of the present invention will now be described with reference to FIGS. 1 and 2 of the drawing. Identical elements in the various figures will be designatd by the same reference numerals.

Referring to FIG. 1, there is shown a fuel tank 1 provided with a filling pipe 2 tightly closed by a tank cap 3. The fuel tank 1 is filled with a fuel 4 consisting of a gasoline-methanol mixture. A pipe 5 is connected to the fuel tank 1 at the highest point of the fuel tank 1. The pipe 5 is connected to a separator 6 which permits only vaporous components of the fuel 4 to enter a pipe 7 communicating with an activated charcoal filter 8, any liquid components of the fuel 4 flowing back into the fuel tank 1 through the pipe 5. The activated charcoal filter 8 is connected by a ventilating line 11 with the outside atmosphere, e.g., through an air intake filter of an internal combustion engine 14. A water-absorbing filter 9 containing a water-absorbing material, e.g., silicagel, is inserted into the ventilating line 11. A pipe 12 leads from the activated charcoal filter 8 to an intake conduit (not shown) of the internal combustion engine 14 so that the volatile fuel components adsorbed in the activated charcoal filter 8 may be delivered to the internal combustion engine 14 during the operation thereof.

A heating device 10 is associated with the water-absorbing filter 9 in heat exchange contact therewith. In an embodiment shown in FIG. 1, the heating device 10 is operated electrically. The heating device 10, consisting of an electric conducting wire, functions to regenerate the water-absorbing filte 9 during the operation of the internal combustion engine 14. To accomplish this regeneration, the heating device 10 may be connected to a current regulator 13 which controls the charging of a vehicle battery 16 by a generator 15. Since the generator 15 is driven by the internal combustion engine 14, the current regulator 13 may be operated during the operating periods of the internal combustion engine 14. In operation, the current regulator 13 first charges the vehicle battery 16 and then delivers to the heating device 10 any excess energy produced by the generator 15.

Figure 2:
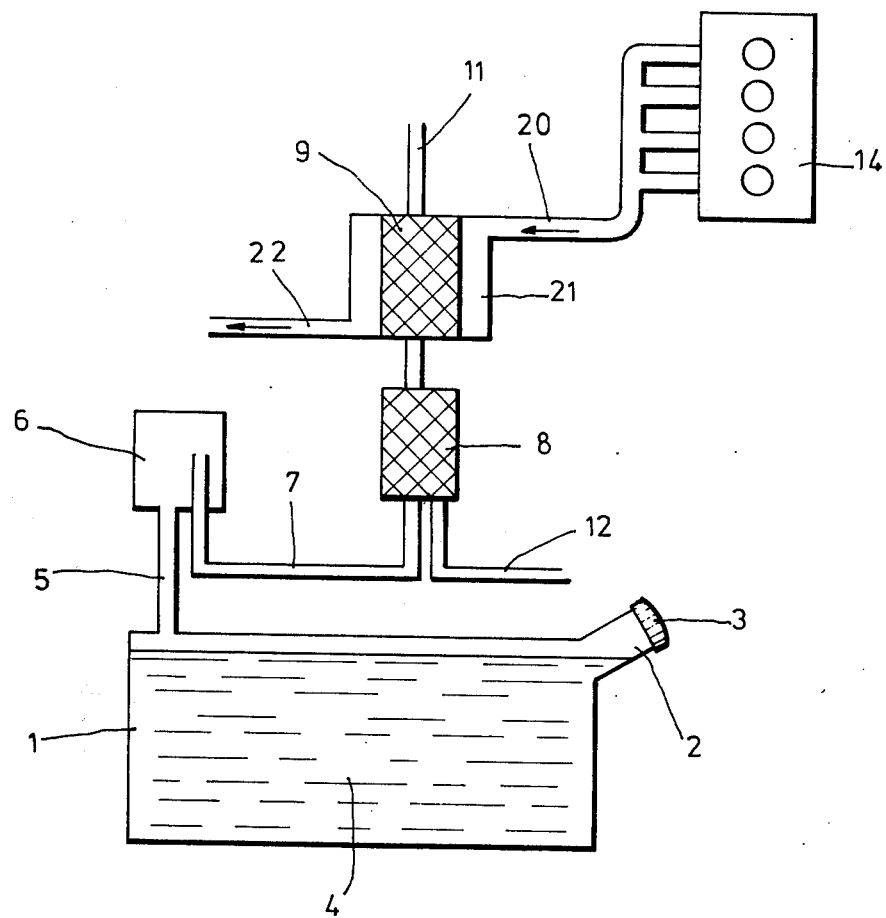
FIG. 2 is a partial diagrammatical illustration of a fuel system of an automobile showingg an alternate embodiment of the present invention.

Referring now to FIG. 2, in an alternate embodiment of the present invention, the water-absorbing filter 9 is heated by exhaust gases emitted from the internal combustion engine 14. In this embodiment, an exhaust conduit 20 collects exhaust gases emitted from individual cylinders of the internal combustion engine 14. The exhaust conduit 20 is connected to housing jacket 21 surrounding the water-absorbing filter 9 in heat exchange contact therewith. A conduit 22 communicates between the housing jacket 21 and an emission system (not shown) of the internal combustion engine 14 so that, during the operation of the internal combustion engine 14, the exhaust gases flow through the housing jacket 21. Like the embodiment of FIG. 1 which utilizes the excess electric energy produced by the generator 15, the alternate embodiment, by utilizing the thermal energy of the normally discharged exhaust gases to heat the water-absorbing filter 9, effectively regenerates the water-absorbing filter 9 without creating an additional energy requirement.

In both embodiments, the water-absorbing filter 9 ventilates the fuel tank 1 with dry air, since moisture contained in the ventilating air is precipitated into the water-absorbing filter 9. As shown in the drawing, the water-absorbing filter 9 is arranged in the ventilating line 11 between the open atmosphere and the activated charcoal filter 8. Accordingly, during the operation of the internal combustion engine 14, the water absorbed in the water-absorbing filter 9 is evaporated and discharged into the outside atmosphere through the ventilating line 11. By heating the water-absorbing filter 9, its operating life is increased through constant regeneration.

It will be understood that the above-described embodiments are merely exemplary and that persons skilled in the art may make many variations and modifications without departing from the spirit and scope of the invention. All such modifications and variations are intended to be included within the scope of the invention as defined in the appended claims.

I claim:

1. In an internal combustion engine operated with a gasoline-methanol mixture as fuel and including a fuel system for supplying the fuel to the internal combustion engine; the improvement comprising a water-absorbing filter and a ventilating line connected to the fuel system and passing through the filter, whereby moisture in the ventilating line is removed so that the fuel system is ventilated with dry air.

2. The internal combustion engine of claim 1, wherein the water-absorbing filter comprises a water-absorbing material.

3. The internal combustion engine of claim 2, wherein the water-absorbing material is silicagel.

4. The internal combustion engine of claim 1, further comprising a heating device associated with the water-absorbing filter for heating the water-absorbing filter during the operation of the internal combustion engine.

5. The internal combustion engine of claim 4, wherein the heating device is heated electrically.

6. The internal combustion engine of claim 5, further comprising a battery-charging generator driven by the internal combustion engine, the electric heating device being operated from excess energy produced by the generator.

7. The internal combustion engine of claim 4, wherein the heating device is heated by hot exhaust gases emitted from the internal combustion engine.

8. The internal combustion engine of claim 7, wherein the heating device includes a housing jacket surrounding the water-absorbing filter, the housing jacket being connected to the internal combustion engine for receiving the exhaust gases therefrom.

9. The internal combustion engine of claim 1, further comprising an activated charcoal filter arranged in the ventilating line between the fuel system and the water-absorbing filter for adsorbing vaporous fuel components from the fuel system.

* * * * *